(12) United States Patent
Syed et al.

(10) Patent No.: US 8,200,614 B2
(45) Date of Patent: Jun. 12, 2012

(54) APPARATUS AND METHOD TO TRANSFORM AN EXTRACT TRANSFORM AND LOAD (ETL) TASK INTO A DELTA LOAD TASK

(75) Inventors: Awez Syed, San Jose, CA (US); Werner Daehn, Brey (DE)

(73) Assignee: SAP France S.A., Paris (FR)

( * ) Notice: Subject to any disclaimer, the term of this patent is extended or adjusted under 35 U.S.C. 154(b) by 618 days.

(21) Appl. No.: 12/113,177

(22) Filed: Apr. 30, 2008

(65) Prior Publication Data

US 2009/0276449 A1  Nov. 5, 2009

(51) Int. Cl.
*G06F 7/00* (2006.01)
*G06F 17/00* (2006.01)
(52) U.S. Cl. ........................................ 707/602
(58) Field of Classification Search ............... 707/602, 707/999.101
See application file for complete search history.

(56) References Cited

U.S. PATENT DOCUMENTS 7,720,804 B2 *  5/2010  Fazal et al. ............... 707/601
2006/0271528 A1 * 11/2006  Gorelik .......................... 707/3

* cited by examiner

*Primary Examiner* — Kimberly Wilson
(74) *Attorney, Agent, or Firm* — Mintz, Levin, Cohn, Ferris, Glovsky and Popeo, P.C.

(57) ABSTRACT

A computer readable storage medium includes executable instructions to support the definition of an Extract Transform and Load (ETL) task. An evaluation of source table structures, source data change indicators, and target table structures is performed. The ETL task is converted to a delta load task in accordance with the evaluation.

18 Claims, 5 Drawing Sheets

US 8,200,614 B2

APPARATUS AND METHOD TO TRANSFORM AN EXTRACT TRANSFORM AND LOAD (ETL) TASK INTO A DELTA LOAD TASK

FIELD OF THE INVENTION

This invention relates generally to the storage and transport of digital data in a networked environment. More particularly, this invention relates to a technique for transforming an Extract Transform and Load (ETL) task into a delta load task.

BACKGROUND OF THE INVENTION

A computer database is a structured collection of records or data that is stored in a computer system. A database relies upon software to organize the storage of data. The software models the database structure in a database model, such as a relational model, a hierarchical model or a network model.

A database transaction is a unit of work performed against a database. A database transaction is treated in a coherent and reliable way independent of other transactions. By definition, a database transaction must be atomic, consistent, isolated and durable. These properties are often referred to by the acronym ACID. The concept of a database transaction can be illustrated in connection with a double-entry accounting system. In a double-entry accounting system each debit requires an associated credit to be recorded. For example, if a purchaser writes a $20 check to a retailer, the transactional double-entry accounting system would record two entries: a $20 debit of the account of the purchaser and a $20 credit to the account of the retailer. In a transactional system, both entries would be made or both entries would fail. By treating the recording of multiple entries as an atomic transactional unit of work, one maintains the integrity of the data recorded.

Periodically, a "snapshot" of transactional data in a database is captured and loaded into a data warehouse. A data warehouse is a repository of data that is designed to facilitate reporting and analysis. In contrast, transactional database systems are optimized for the preservation of data integrity and the speed of recording business transactions. Data warehouses are optimized for speed of data retrieval. Frequently, the form of data in a transactional database is altered for storage in a data warehouse.

Extract Transform and Load or ETL is a process that involves extracting data from a source system (e.g., a transactional database), transforming it to fit business needs, and loading it into a target (e.g., a data warehouse). ETL tools are commercially available, such as Data Integrator™, which is sold by Business Objects™ an SAP™ Company located in San Jose, Calif.

Existing ETL tools perform strongly when initially populating a target with source data. Updating the target in response to changes in the source is called a delta load. Delta loads create challenges. Change Data Capture or CDC refers to software implemented methods used to identify and process source data that has changed. CDC is commonly associated with data warehouses because capturing and preserving the state of data is a core function of a data warehouse. CDC commonly relies upon a source system indicator of some kind, such as a timestamp, a database transaction log, and the like. A transaction log is typically a file of database updates stored in a reliable manner. In other words, a transaction log stores a sequence of data modifications associated with a database management system.

Techniques to construct ETL tasks are known. Similarly, techniques to define delta load tasks are known. Unfortunately, these techniques can be labor intensive and error prone. For example, many delta load tasks require the construction of multiple data flows, which can be time consuming and result in errors. Existing delta load techniques fail to leverage the information associated with ETL tasks.

Therefore, it would be desirable to leverage information associated with a defined ETL task to automatically specify a delta load task. To achieve this, it is necessary to automatically develop an appropriate strategy for a delta load task in view of system resources.

SUMMARY OF THE INVENTION

The invention includes a computer readable storage medium with executable instructions to support the definition of an Extract Transform and Load (ETL) task. An evaluation of source table structures, source data change indicators, and target table structures is performed. The ETL task is converted to a delta load task in accordance with the evaluation.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
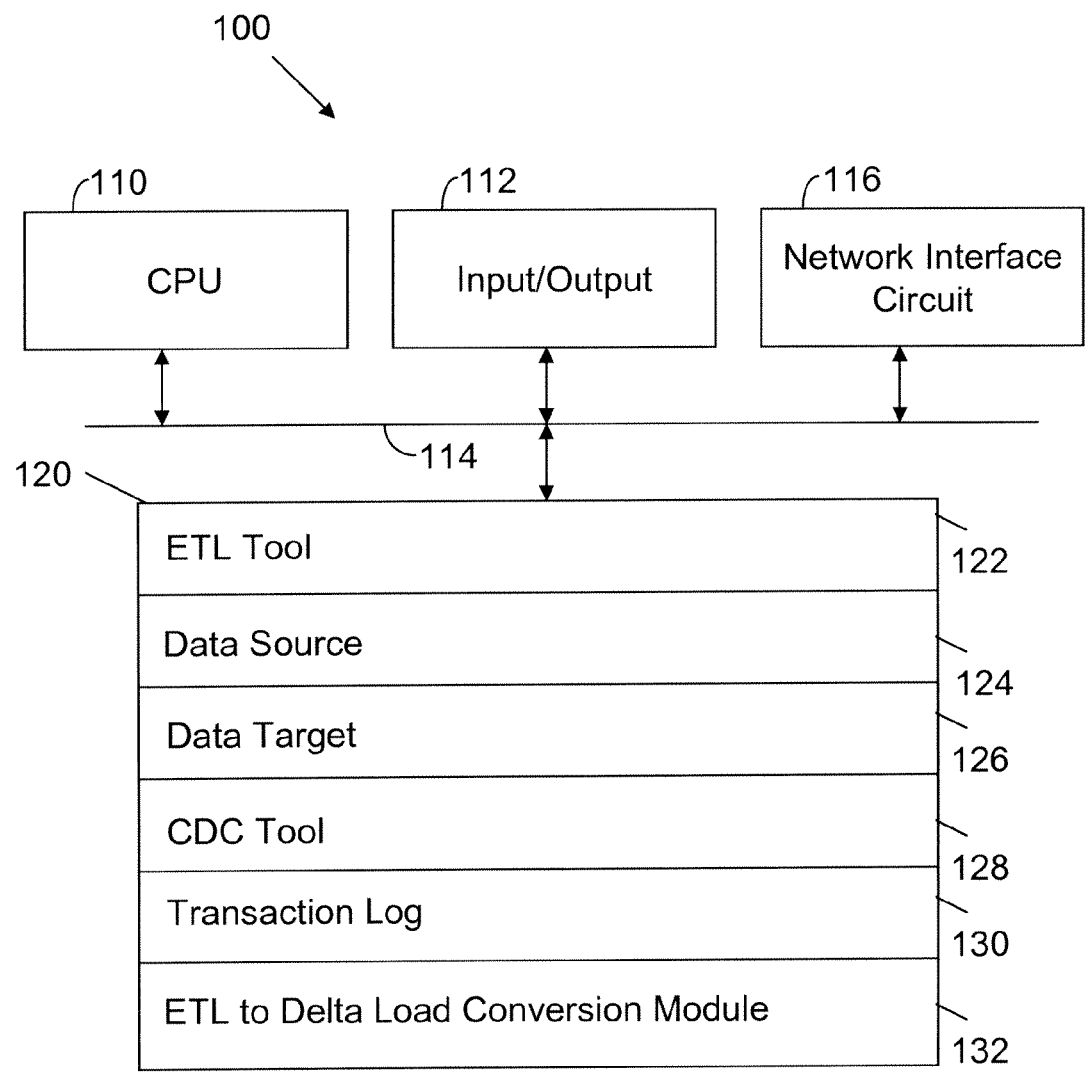
FIG. 1 illustrates a computer configured in accordance with an embodiment of the invention.

FIG. 1 illustrates a computer 100 configured in accordance with an embodiment of the invention. The computer 100 includes standard components, such as a central processing unit 110 connected to a set of input/output devices 112 via a bus 114. The input/output devices 112 may include a keyboard, mouse, display, printer and the like. Also connected to the bus 114 is a network interface circuit 116, which supports connectivity to a network (not shown). Thus, the computer 100 can, and typically does, operate in a networked environment.

A memory 120 is also connected to the bus 114. The memory 120 stores executable instructions to implement operations of the invention. The memory 120 includes an ETL tool 122 to implement standard ETL tasks. Thus, for example, the ETL tool 122 can access a data source 124 to migrate data to a data target 126. The data source 124 may be a transactional database and the data target 126 may be any target, such as a data warehouse, a database, a file, and the like. For simplicity, the data source 124 and the data target 126 are shown as residing on a single machine. The data source and data target may also reside on separate machines.

The memory 120 also includes a CDC tool 128, which provides access to a transaction log 130 that documents changes to the data source 124. The transaction log is typically created by a database. The CDC tool 128 may be a part of the ETL tool 122. The ETL tool 122 may use the CDC tool to query changes for a specific table.

The ETL tool 122 relies upon manual specification of a delta load task. For example, the ETL tool 122 may provide a Graphical User Interface (GUI) and drag and drop icons to specify a delta load task. These manual operations can be time consuming and error prone. In addition, it takes a technically sophisticated individual to even attempt such a task.

The invention eliminates the need for manually specifying a delta load task. Thus, the invention avoids the problems associated with manually specifying a delta load task. In one embodiment, the operations of the invention are implemented with an ETL to delta load conversion module 132. The conversion module 132 includes executable instructions to automatically construct a delta load task based upon an ETL initial load task. The conversion module 132 includes executable instructions to evaluate source table structures, source data change indicators, and target table structures. Based upon this evaluation, the ETL task is converted to an appropriate delta load task. The evaluation allows different delta load strategies to be selected based upon system resources. For example, the delta load strategies may be target based, timestamp based, CDC based with primary key information only or CDC based with full table structure information. Each of these strategies is discussed below.

The conversion module 132 supplements the operations of the ETL tool 122 and the CDC tool 128. In particular, the conversion module 132 relies upon the ETL initial load task to make changes to the process flow to establish an appropriate delta load task. The conversion module 132 relies upon the source data change indicators, such as those reflected in the transaction log 130, to help reconstruct sufficient information to establish a delta load task. For example, the conversion module 132 may look at change records and combine these records with source information to establish a mapping to a target.

The conversion module 132 may be a standalone module or it may be incorporated into an ETL tool. The modules of memory 120 may be combined in any number of ways. Similarly, the modules may be distributed across a network. It is the operations of the invention that are significant, not the precise location or manner in which they are implemented.

Figure 2:
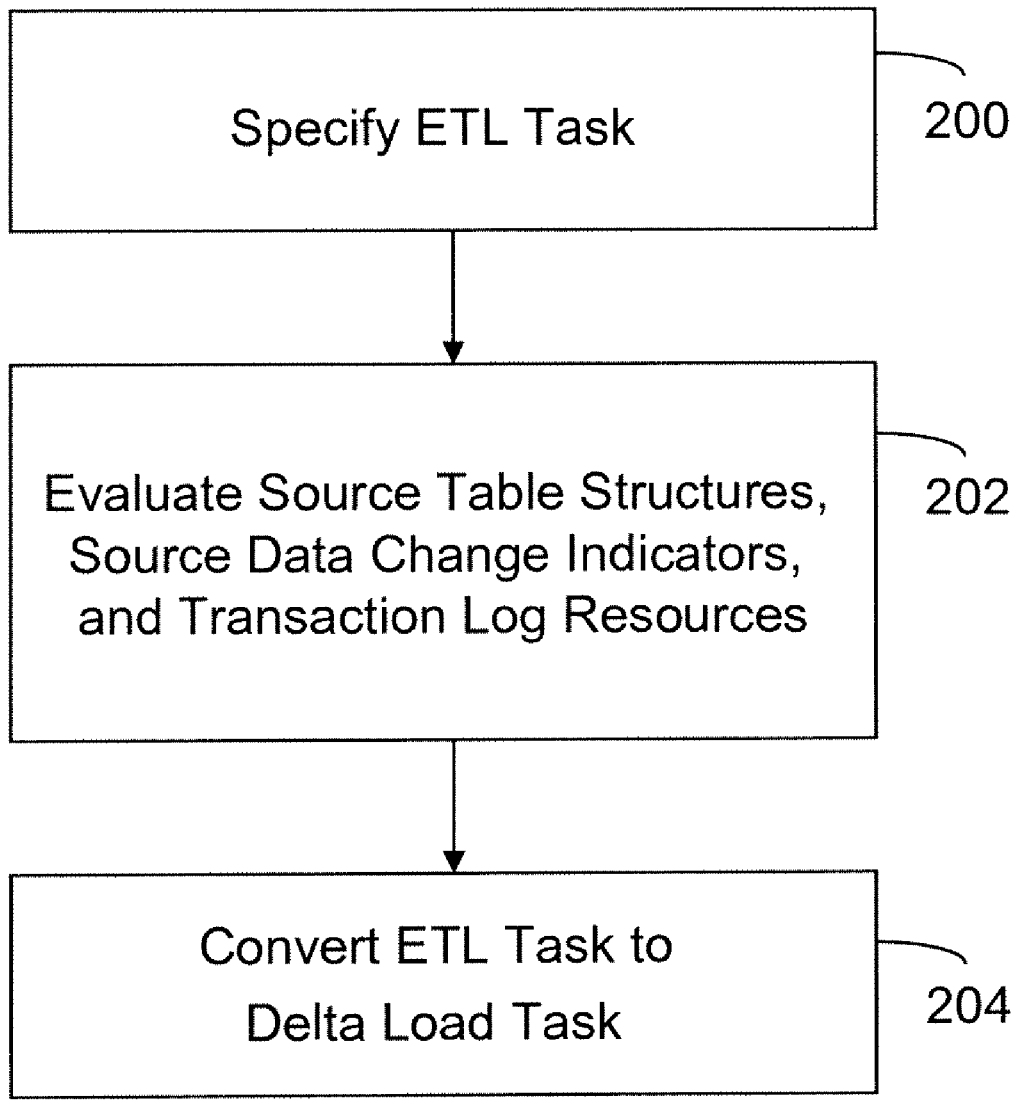
FIG. 2 illustrates processing operations associated with an embodiment of the invention.

The operations of the invention are illustrated in FIG. 2. Initially, an ETL task is specified 200. The ETL tool 122 may be used to implement this operation. Source table structures, source data change indicators and target table structures are then evaluated 202. The conversion module 132 may be used to perform this evaluation. Based upon the evaluation, the ETL task is converted to a delta load task 204. The conversion module 132 may be used to implement this operation. The operations of the invention are more fully appreciated in connection with the following detailed discussion of the automatic construction of different delta load tasks based upon different system resources.

With existing ETL tools, it is the end-user's responsibility to build a data flow for an initial ETL task. Updates to the target are then established with a separately constructed delta load data flow.

Figure 3:
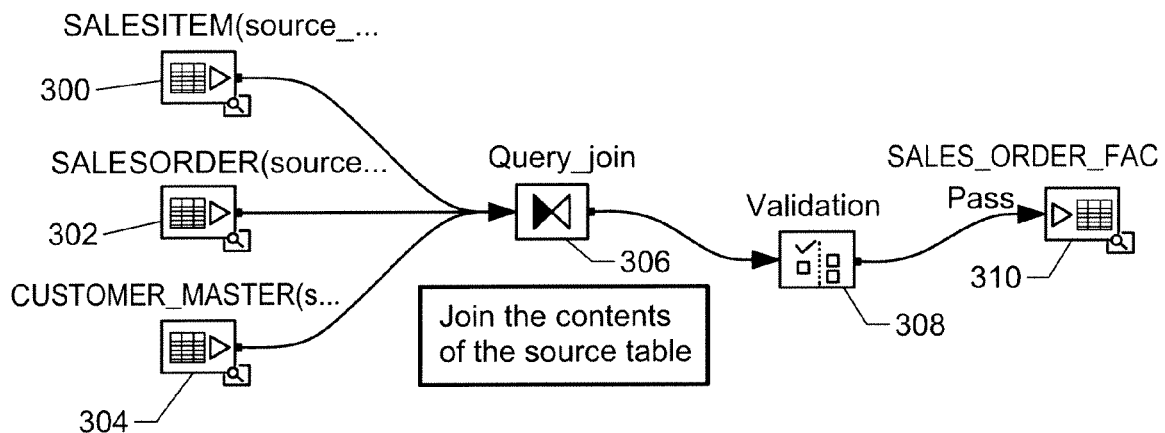
FIG. 3 illustrates the construction of an ETL task.

FIG. 3 illustrates the construction of an ETL task using GUI based drag and drop icons. In this example, source tables 300, 302 and 304 are specified and accessed. A join of the source tables is performed by the query join transform icon 306. The data is then validated with a validation transform 308 before being loaded into the target table 310. This is merely an example. The invention is not limited to these transformations. The invention is applicable to any number of source tables and transformations. The invention allows one to build and reuse transformation of an initial load in a delta load. The invention reduces the number of rows to be transformed and makes sure that the changes are applied correctly to the target, e.g., update changed rows, insert new source rows, etc.

A delta load is different than the specified ETL task. For example, there could be a change in SALESORDER table 302, but no changes in tables 300 and 304—and vice versa for another SALESORDER row. As a result, the changed records of one table are read and their contents are joined with the other source table. This minimizes the amount of data to be read. Next, all changed rows of the other source table is read and joined with the second source table. Then data is de-duplicated and loaded applying the same transformations. This might require the construction of multiple data flows or a more complex single data flow.

Embodiments of the invention eliminate the need to manually construct multiple and/or complex data flows. In addition, embodiments of the invention reduce accesses to the data source when possible. The invention automatically specifies a delta load task This delta load task may be executed or the user may build a delta load manually, as desired. In the latter case, the user has all data access methods and transformations required to construct delta load flows manually.

When the conversion module 132 evaluates system resources and identifies that no change data information is available at the source, a target based delta load task is automatically implemented. The conversion module 132 automatically implements a target based delta load task when the source tables have a primary key, which will be the case in most instances. The target based delta load flow corresponds to the initial ETL task, but a Table Comparison transform is added before the target table.

Figure 4:
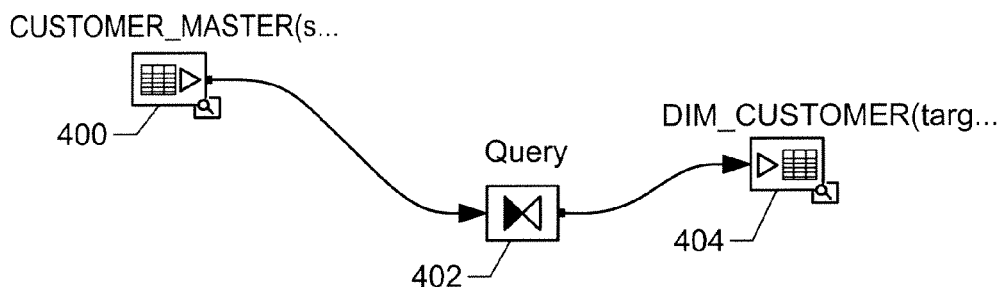
FIG. 4 illustrates the construction of an ETL task in accordance with an embodiment of the invention.
Figure 5:
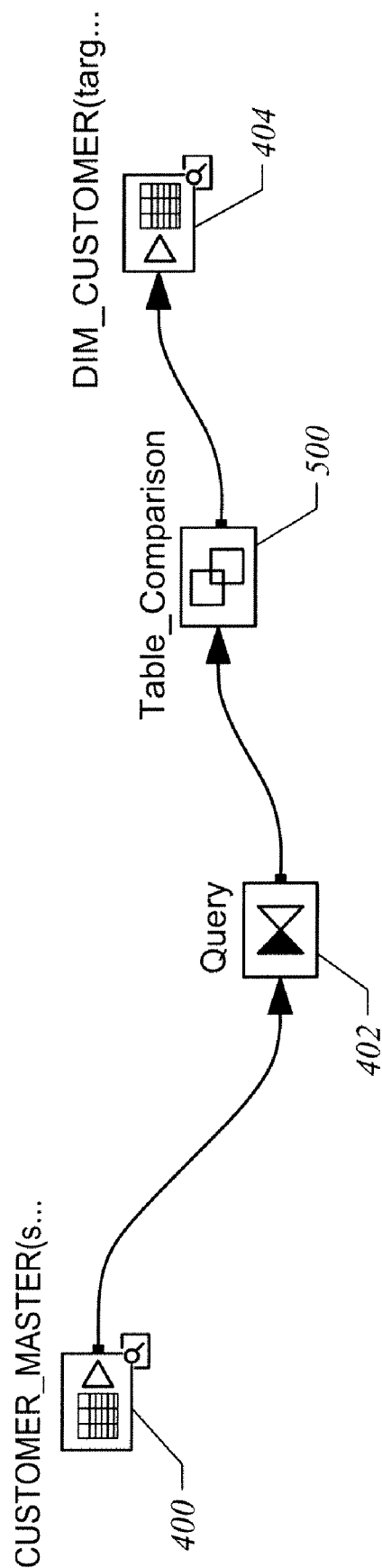
FIG. 5 illustrates the automatic insertion of a table comparison operation into the ETL task of FIG. 4 to produce a delta load task.

Consider an initially specified ETL task as shown in FIG. 4. A query transform 402 is applied to a source table 400, with the results being loaded into a target table 404. The conversion module 132 converts the ETL task of FIG. 4 into a delta load task with a table comparison transform, as shown in FIG. 5. In particular, FIG. 5 illustrates the original ETL transforms 400, 402 and 404. In addition, a table comparison transform 500 is inserted into the work flow.

Assume that the CUSTOMER_MASTER table 400 was copied to the target table DIM_CUSTOMER 404 during initial load and must now be kept synchronized with later delta loads. The current CUSTOMER_MASTER table might have a fourth row with the Primary Key CUSTOMER_ID="D" and a change for the city in "B", as shown below.

CUSTOMER_MASTER—CURRENT

| CUSTOMER_ID | FIRSTNAME | LASTNAME | CITY | COUNTRY |
|---|---|---|---|---|
| A | Bill | Haley | LA | U.S. |
| B | Frank | Comet | SF | U.S. |
| C | Tom | Star | NY | U.S. |
| D | Giles | Moon | SD | U.S. |

DIM_CUSTOMER before current delta run

| CUSTOMER_ID | FIRSTNAME | LASTNAME | CITY | COUNTRY |
|---|---|---|---|---|
| A | Bill | Haley | LA | U.S. |
| B | Frank | Comet | Philli | U.S. |
| C | Tom | Star | NY | U.S. |

In this case, a table comparison compares the input rows with the target table rows. For rows A and C it will find no changes and therefore discard the rows. For the B record it will forward the row marked as updated so that the target table will issue an update statement against the database. The D record cannot be found in the target so it gets flagged as insert row, as shown below.

| Flag | CUSTOMER_ID | FIRSTNAME | LASTNAME | CITY | COUNTRY |
|---|---|---|---|---|---|
| Update | B | Frank | Comet | SF | US |
| Insert | D | Giles | Moon | SD | US |

In the current version of any ETL tool, the end user has to build such a dataflow manually a second time for a delta load task. In contrast, the conversion module 132 of the invention automatically adds the Table Comparison transform (or an analogous transform) directly before the target table. If a Key Generation transform (a transformation that creates an additional surrogate key column for the target) is used in the initial load, the Table Comparison transform is placed before that transform. The columns used to find a matching row, referred to herein as "input primary keys", are the columns identified as a primary key in the last transform before the target table. Using this technique, the automatically built dataflow can even be built when the required target table primary key is an arbitrary number.

The automatically created dataflow may be optimized using manual or automated techniques, for example to allow parallel processing. To allow for greater flexibility, the target table loader object includes settings that may be used for delta load. For example, the settings may include:

- Not delta loaded: If a dataflow has multiple target tables, some might be log tables dealing with data errors or similar tables that should get appended during the delta run. This flag is set for such tables.
- Optional properties the table comparison transform allows one to specify.
- Target table is of type Slow Changing Dimension Type 2 (so called "SCD2", a standard term and technique in data warehouses): If this flag is set, the user has to define what the optional columns in the target table are used as a valid_from, valid_to and current_indicator and this information is then used to build a delta dataflow that is loaded.

Figure 6:
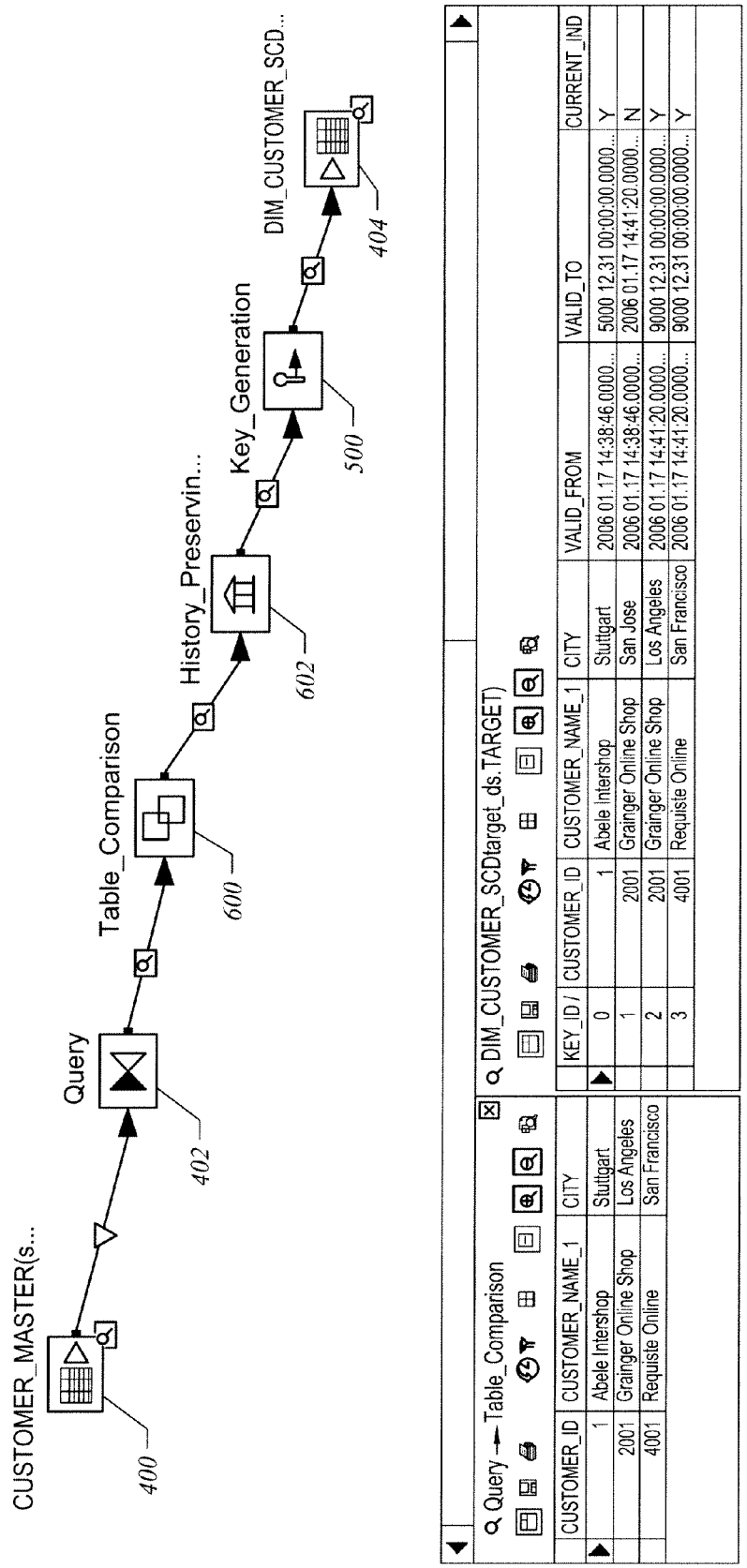
FIG. 6 illustrates the automatic construction of a delta load task to track slow changing dimensions in accordance with an embodiment of the invention.

Consider the case of a slowly changing dimension. If the end-user has built an initial load job before, but with a Key Generation transform, and he did set the SCD2 settings in the table loader, the conversion module 132 converts that into a delta load adding the Table Comparison and History Preserving transform before the Key Generation, if one exists. FIG. 6 illustrates the previously described transforms 400, 402, 500, and 404. The work flow is supplemented to include a history preserving transform 600 and a key generation transform 602. The transforms mentioned here are not required to be implemented as separate transform objects. The transforms represent types of data modifications. The actual implementation of each data modification may differ in accordance with different embodiments of the invention.

Consider now the case where the source table has timestamps that indicate data changes. In this case, the conversion module 132 processes time stamp information to automatically construct a delta load task. In one embodiment, the conversion module 132 determines whether the source table(s) have a last change date column or any other expression that can be used to constrain the amount of rows that need to be tested for potential changes.

There are different time stamp methodologies. Many source tables add a creation date on their insert and whenever updated. The conversion module 132 specifies the expression used to compare the time stamp column value. For example, two fields called "CDC begin date" and "CDC end date" may be used. In most cases the user picks the variables used for begin_date and end_date of the delta load. A where clause may be used to find potential changes (e.g., "where change_date>=$START_DATE and change_date<=$END_DATE"). Alternatively, one can specify a free form where clause to deal with more complex scenarios like "where year(fiscal_date)>=year($START_DATE)-1".

The conversion module 132 converts this dataflow in such a way that it creates multiple joins, one per source table with its corresponding delta where clause. In this case, it looks as if all sources are read multiple times, but the delta load flow may be optimized for execution performance. These joins are similar to the original join, except the delta where clause for the corresponding source table is added. If this source table is an outer join target table, it gets converted to an inner join for this query.

All the outputs of the queries are then merged (union all) and made distinct to deal with rows that had been changed in two or more source tables. The result of this distinct operation is then the source dataset for the further transformations and is finally loaded into the target table via a table comparison.

Thus, the approach is similar to the approach in the case of a target based delta load. However, only sub-sets of the data source are read, not the entire data source.

Times stamp based processing is more fully appreciated in connection with the following exemplary source tables.

| ORDER_NUMBER | CUSTOMER_ID | STATUS | CHANGE_DATE |
|---|---|---|---|
| 1 | A | O | 23/01/1999 |
| 2 | B | C | 21/03/2008 |
| 3 | A | E | 21/03/2008 |
| 4 | C | O | 19/03/2008 |

| ORDER_NUMBER | ORDER_LINE | MATERIAL | CHANGE_DATE |
|---|---|---|---|
| 1 | 1 | Screw | 23/01/1999 |
| 1 | 2 | Nail | 21/03/2008 |
| 2 | 1 | Hammer | 03/01/2008 |
| 2 | 2 | Saw | 03/01/2008 |
| 3 | 1 | Nail | 21/03/2008 |
| 4 | 1 | Screw | 19/03/2008 |

| CUSTOMER_ID | FIRSTNAME | LASTNAME | CHANGE_DATE |
|---|---|---|---|
| A | Bill | Miller | 01/01/1999 |
| B | Bob | Smith | 01/03/1999 |
| C | Frank | Jones | 21/03/2008 |

For this example, assume one wants all changes since Mar. 21, 2008. All three source tables are configured with change_date as the timestamp column and Mar. 21, 2008 as the expression. By looking at the change_date column in each table one finds a few changes in each table. Order=2 might have received a new status, ORDER_NUMBER=3 was just created with one line item, and ORDER_LINE=2 of ORDER_NUMBER=1 was added. Customer C has a name change.

If all rows are initially loaded, the new status is displayed in the target table for both lines of ORDER_NUMBER=2, all rows of CUSTOMER_ID=C would have the new name, etc. Therefore, for each source table, the changed rows are read. Other tables are joined together as in the case of an initial load. With SALESORDER being the first table picked, one would find ORDER_NUMBER={2,3} and join these two rows to the SALESITEM and CUSTOMER table, resulting in:

| ORDER_NUMBER | ORDER_LINE | STATUS | MATERIAL | LASTNAME |
|---|---|---|---|---|
| 2 | 1 | C | Hammer | Smith |
| 2 | 2 | C | Saw | Smith |
| 3 | 1 | E | Nail | Miller |

A second query is executed to find all the changes driven by the ITEMs. This results in ODER_LINE=2 of ORDER_NUMBER=1 and ORDER_LINE=1 of ORDER_NUMBER=3. The resulting dataset joining these ITEM records to ORDER and CUSTOMER returns:

| ORDER_NUMBER | ORDER_LINE | STATUS | MATERIAL | LASTNAME |
|---|---|---|---|---|
| 1 | 2 | O | Nail | Miller |
| 3 | 1 | E | Nail | Miller |

But there is also a change for CUSTOMER_IC=C. All changed customer records are joined to the other tables. That is, all records in the ORDER table that have CUSTOMER_ID=C and all items for customer C result in one order with a single line item.

| ORDER_NUMBER | ORDER_LINE | STATUS | MATERIAL | LASTNAME |
|---|---|---|---|---|
| 4 | 1 | O | Screw | Jones |

The three datasets together provide the data that needs to be changed in the target to get the same result as if we would do an initial load of all the data now. We might have one row multiple times because it got changed at multiple places, e.g. ORDER_NUMBER=3 exists twice, once because it is a new order and once because it received a new line item. The data is made distinct and is further processed.

Consider now the case where the transaction log includes primary key information. In particular, the conversion module 132 identifies that at least one source table is CDC enabled, all source tables have primary keys, the joins are equijoins only, the join condition is using all primary key columns on one side of the expression for each relationship, and each table can be joined to many master tables, but can have one detail table at maximum. The conversion module 132 also relies upon the source database having valid foreign key constraints between tables. No updates on primary keys are allowed.

In this mode, the source table changes are captured and accessible by the CDC component and it is configured in the mode where the primary key information is available only. This is a mode that makes it easier for the source database to capture changes since little overhead data is saved in the logs used by the CDC component and still one can build an efficient delta load.

From the end-user perspective and from the internal handling, this approach is similar to the timestamp based scenario. There is no date column, but a CDC table indicates change. For each change found, rows required for the final dataset are joined with source tables.

CDC also captures deletes. With CDC there may be multiple rows per primary key—multiple changes—that could be rolled up. However, to optimize performance, the delta load flow is more complex.

First, all CDC tables are read for the time-range the delta load should cover. As with the timestamp based delta, an expression is specified for the begin/end date. However, this time the where clause is based on the transaction log timestamp only. The read data includes the OPCODE of the row (e.g., insert, update, delete). The data is read in the same order as it was committed in the source and is rolled up using the following rules:

1. If an update is preceded by an insert, the row remains as insert.
2. Whenever there is a chain of insert—(updates)—delete, the entire block of rows is discarded.
3. A delete followed by an insert becomes an update row.
4. If the last opcode is a delete, the row is outputted as delete.
5. Otherwise the opcode is kept.

The foregoing rules are cumulative. As an example, one might find the following chain in the CDC log: update-update-update-delete-insert-update. An update followed by an update still remains an update (rule 5), so the first three updates get converted into an update. This update is followed by a delete and according to rule 4 the row is treated as delete now. But then an insert occurs, and according to rule 3, the delete becomes an update now and remains an update.

For all the remaining rows after the rollup that are of type insert or update, one performs a lookup against the source table to fetch the column values of all the columns that are not primary keys and are required in the output. Rows that are marked as delete will have null values in all columns except the primary key. The result is cached and is called the "driving CDC data".

The next step is to fill the other tables in order to make the data complete. If one record has the flag insert, e.g., a new order was created, one does not have to look into all related tables. The ITEM, for example, is the detail table with order table as the master and therefore a new order requires new order lines, but no existing order lines. Hence, order lines do not need to be made complete for this new order. Customer is the master table for the orders. Therefore, one can create a new order for an already existing customer only. To optimize the handling, the relationship information is used to figure out what rows have to be looked up in the other tables. Any of the driving tables may be selected and read row by row. Any of the tables this table has a relationship with is picked.

1. If the row is of type insert and the table acts as a master table, then this fill step is skipped for the row—no lookup against the source required for the related table.
2. If the row is of type insert and is the detail row, we need to make sure the related master table row exists. So either it exists in the cache already or we need to look it up and store it in the cache. For the latter case, the new master record itself might have dependant masters, these have to be added, if required, using the same procedure.
3. If the row is an update and acts as the master, then we have to issue a lookup to find all dependant rows in the detail.
   1. The found row is not in the cache already: add it there, mark it as "complete" and for all master rows and their masters run through an algorithm like rule 2. For all subsequent details run through rule 3.
   2. The found row is in the cache coming from the CDC: Nothing has to be done.
   3. The found row is in the cache marked as "complete": Nothing has to be done.
   4. The found row is in the cache but not marked as complete: This row was added to the cache to get a master for its detail. But now we need to make sure not only one detail row exists but all exist. So we mark that existing cache row as "complete" and run through rule 3 for all its detail rows.
4. If the row is an update row and acts as the detail, then we need to check if the partner master row is cached already, otherwise look it up.
5. If the row is of type delete and the table's primary key is found in the target table, then the row remains, otherwise the row gets discarded. If none of the table's primary keys can be found in the target, then an error is raised at run time telling that deletes are not supported.

By looking at the primary key and the join clause one can determine if a table is a master or detail of another table. It is a requirement that a join clause, e.g. "ORDER.ORDER_NUMBER=ITEM.ORDER_NUMBER", contains all primary key columns at one side. The side with the primary key columns is the master table. In this example, ORDER_NUMBER is the primary key of the ORDER table. Thus, ORDER is the master with ITEMs as detail. If this prerequisite is violated, the validation of the flow fails and the delta load version cannot be generated automatically.

The last step is to join the cached segments for the insert/update rows, output them as normal rows, let them flow through all the transformations and load them using a Table Comparison transform before the table loader.

For the deleted rows, a separate dataflow is generated, deleting the rows with the same keys in the target. As said before, for this to work one table has to be identifiable as the most detailed table (ITEM in our case) and its primary key columns have to be loaded into the target table via a 1:1 mapping. Otherwise this delta load version does not support deletes and will fail the first time a delete is uncovered (delete after the rollup) in any of the source tables.

Consider the following example. For simplicity, all rows are changed only once per day, otherwise the rollup process would be used, but the process would be the same.

| ORDER_NUMBER | CUSTOMER_ID | STATUS | TIMESTAMP | LAST_OPCODE |
|---|---|---|---|---|
| 1 | A | O | 23/01/1999 | Insert |
| 2 | B | C | *21/03/2008* | Update |
| 3 | A | E | *21/03/2008* | Insert |
| 4 | C | O | 19/03/2008 | Insert |

| ORDER_NUMBER | ORDER_LINE | MATERIAL | TIMESTAMP | LAST_OPCODE |
|---|---|---|---|---|
| 1 | 1 | Screw | 23/01/1999 | Insert |
| 1 | 2 | Nail | *21/03/2008* | Update |
| 2 | 1 | Hammer | 03/01/2008 | Insert |
| 2 | 2 | Saw | 03/01/2008 | Insert |
| 3 | 1 | Nail | *21/03/2008* | Insert |
| 4 | 1 | Screw | 19/03/2008 | Insert |

| CUSTOMER_ID | FIRSTNAME | LASTNAME | TIMESTAMP | LAST_OPCODE |
|---|---|---|---|---|
| A | Bill | Miller | 01/01/1999 | Insert |
| B | Bob | Smith | 01/03/1999 | Insert |
| C | Frank | Jones | *21/03/2008* | Update |

This is the current state of the source tables. Many records were inserted a while back; some were newly created or updated on Mar. 21, 2008. When we read the changes from the CDC component we will get the rows for this date only with their OPCODE. As an example, ORDER_NUMBER=2 got created in year 1999, but was changed on Mar. 21, 2008. Thus, the current status in the table is the new one and the CDC component reflects that ORDER_NUMBER=2 got updated on Mar. 21, 2008. Therefore, the CDC component reports the change that happened, when, and the primary key for each table.

| ORDER_NUMBER | TIMESTAMP | LAST_OPCODE |
|---|---|---|
| 2 | 21/03/2008 | Update |
| 3 | 21/03/2008 | Insert |

| ORDER_NUMBER | ORDER_LINE | TIMESTAMP | LAST_OPCODE |
|---|---|---|---|
| 1 | 2 | 21/03/2008 | Update |
| 3 | 1 | 21/03/2008 | Insert |

| CUSTOMER_ID | TIMESTAMP | LAST_OPCODE |
|---|---|---|
| C | 21/03/2008 | Update |

The join clause and the primary keys are evaluated. One join clause is ORDER.ORDER_NUMBER (the Primary Key)= ITEM.ORDER_NUMBER and the other is ORDER.CUSTOMER_ID=CUSTOMER.CUSTOMER_ID (the Primary key). So just by looking at that, one knows that ORDER is the master table for ITEM and CUSTOMER is the master of ORDER. In other words, one customer can have many orders but one order belongs to one customer only. An order can have many items, but each item belongs to a single order always. The processing starts with any CDC component. Suppose ORDER is picked. The first row (ORDER_NUMBER=2 of type update) is taken and a lookup is performed against the source table to get the current values for CUSTOMER_ID and STATUS. The results of the entire row are stored in the cache. This is repeated for all rows and for all tables. The end result is a rolled up version of the CDC data with all columns in their current state.

| ORDER_NUMBER | CUSTOMER_ID | STATUS | TIMESTAMP | LAST_OPCODE |
|---|---|---|---|---|
| 2 | B | C | 21/03/2008 | Update |
| 3 | A | E | 21/03/2008 | Insert |

| ORDER_NUMBER | ORDER_LINE | MATERIAL | TIMESTAMP | LAST_OPCODE |
|---|---|---|---|---|
| 1 | 2 | Nail | 21/03/2008 | Update |
| 3 | 1 | Nail | 21/03/2008 | Insert |

| CUSTOMER_ID | FIRSTNAME | LASTNAME | TIMESTAMP | LAST_OPCODE |
|---|---|---|---|---|
| C | Frank | Jones | *21/03/2008* | Update |

Next a join condition is picked with the starting table ORDER in it, e.g. ORDER-to-ITEM. ORDER is the master and ITEM is the detail. The first row is of type update and the table acts as a master—rule 3 kicks in. We should find all rows in the ITEM table that belong to ORDER_NUMBER=2. We cannot go to the CDC table, we need to look into the source table and will find two rows, ORDER_LINE={1,2} created Jan. 3, 2008. These two rows are added to the ITEM table to fill up the rows required for the join later. If by coincidence a row exists in the cache already, the cache is not loaded. At this point, the ITEM table will look like:

| ORDER_NUMBER | ORDER_LINE | MATERIAL | TIMESTAMP | LAST_OPCODE |
|---|---|---|---|---|
| 1 | 2 | Nail | *21/03/2008* | Update |
| 2 | 1 | Hammer | | COMPLETE |
| 2 | 2 | Saw | | COMPLETE |
| 3 | 1 | Nail | *21/03/2008* | Insert |

New rows are inserted that did not exist in the cache. The rows are marked as complete according to sub-rule 3.1. Dependant tables are checked for masters and details. In this example there are no other dependant tables so processing is complete.

The next row found in the ORDER table is of type insert. Rule 1 applies—we should not do anything, because we assume all changes in the ITEM table will be there already, read from the CDC component.

The first relationship of the ORDER table is completed. The relationship to CUSTOMER also needs to be processed. This time ORDER is the detail for CUSTOMER. The first row was the update for ORDER_NUMBER=2. Rule 4 applies and therefore we first check the cache of CUSTOMER if CUSTOMER_ID=B exists. It does not, so it is added to the cache. Therefore, ORDER can be joined with the CUSTOMER table. The important difference from the previous case is, here we just need to make things complete, so we check the cache if the one row for the customer exists already and otherwise read it from the database. In the previous case we had to read all ITEMs that belong to that order even if the cache for the ITEMs would have had some already. We needed to make sure it had all items. CUSTOMER does not have a required master. Therefore, processing is complete.

The second row is of type insert. Rule 2 has to be executed and again we just need to check if the customer master for customer A exists. It does not so we look it up and add it and no further dependant tables exist. At this point in time, the CUSTOMER cache looks like:

| CUSTOMER_ID | FIRSTNAME | LASTNAME | TIMESTAMP | LAST_OPCODE |
|---|---|---|---|---|
| A | Bill | Miller | | |
| B | Bob | Smith | | |
| C | Frank | Jones | *21/03/2008* | Update |

We have added the A & B record for completeness; C comes from the CDC component. We are done with all dependencies the ORDER table has; we arbitrarily pick ITEM next. It has one relationship only, the one to ORDER and it acts as a detail table to the order master. We have a first update for ORDER_NUMBER=1—rule 4—and the master record is not in the cache already. We need to look it up and add it to the cache. As we have added a master record to the cache we need to go through its dependencies. The table has another relationship to customer with customer being the master. So we check the cache first for ORDER_NUMBER=1. The referenced customer A exists in the table. Therefore, everything is complete and nothing needs to be made complete. Same thing with the insert—rule 2—but its ORDER_NUMBER=3 and it already exists in the cache so nothing has to be done to make it complete.

| ORDER_NUMBER | CUSTOMER_ID | STATUS | TIMESTAMP | LAST_OPCODE |
|---|---|---|---|---|
| 1 | A | O | | |
| 2 | B | C | *21/03/2008* | Update |
| 3 | A | E | *21/03/2008* | Insert |

ORDER_NUMBER=1 got added because of the ITEM table; the other two came from the CDC component.

The last table is the customer table with one update for customer C. The customer table has just one relationship—the join condition to the order table. The customer acts as a master—rule 3. We need to find all orders customer C ever had. We need to search in the source table and merge them into the cache. In this example, the only order customer C ever had was ORDER_NUMBER=4. It is not in the cache so we have to add it and make it complete. As ORDER has a relationship to ITEM, we have to add all the items the ORDER_NUMBER=4 has to the item cache, except such a row would exist there already. So we add the one row to the ITEM cache.

Consider if ORDER_NUMBER=4 had a second line inserted today. If that CDC table would have been processed before, the ORDER table would have such an ORDER_NUMBER=4 already, but not marked as complete. Therefore, although the cache had such a row already, the above process would be the same: search all ORDER_NUMBER=4 line items in order to make the ORDER_NUMBER=4 complete. So at the end, we have four ORDERs:

| ORDER_NUMBER | CUSTOMER_ID | STATUS | TIMESTAMP | LAST_OPCODE |
|---|---|---|---|---|
| 1 | A | O | | |
| 2 | B | C | *21/03/2008* | Update |
| 3 | A | E | *21/03/2008* | Insert |
| 4 | C | O | | COMPLETE |

| ORDER_NUMBER | ORDER_LINE | MATERIAL | TIMESTAMP | LAST_OPCODE |
|---|---|---|---|---|
| 1 | 2 | Nail | *21/03/2008* | Update |
| 2 | 1 | Hammer | | COMPLETE |
| 2 | 2 | Saw | | COMPLETE |
| 3 | 1 | Nail | *21/03/2008* | Insert |
| 4 | 1 | Screw | | COMPLETE |

| CUSTOMER_ID | FIRSTNAME | LASTNAME | TIMESTAMP | LAST_OPCODE |
|---|---|---|---|---|
| A | Bill | Miller | | |
| B | Bob | Smith | | |
| C | Frank | Jones | *21/03/2008* | Update, COMPLETE |

The conversion module may also automatically form a delta load task based upon transaction logs with complete source tables. This processing is identical to the foregoing processing except the lookup against the source table is not required since the transaction log contains all the data already. Everything else remains the same. Hence, a mixture of both modes is possible too.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   support the definition of an Extract Transform and Load (ETL) task, the ETL task extracting data from source tables of one or more sources, transforming the extracted data to a format compatible with a respective target of a plurality of targets, and loading the transformed data into a target table of the respective target;
   determine changes in the source tables by performing an evaluation of source table structures, source data change indicators, and target table structures, the source data change indicators being identified using a transaction log, the transaction log identifying changes made to a corresponding source table structure of the source tables; and
   convert the ETL task, based on the source data change indicators identified in the transaction log, to a delta load task in accordance with the evaluation, the delta load task automatically updating the target table of the respective target in accordance with the determined changes in the source tables, wherein the delta task is different from the ETL task and is selected, based on available system resources, from a plurality of delta load tasks that include at least one of the following: a target-based delta task, a timestamp-based delta task, a capture-data-change-based with primary key information only delta task, and a capture-data-change-based with full table structure information delta task.

2. The non-transitory computer readable storage medium of claim 1 wherein the evaluation identifies an absence of source data change indicators.

3. The non-transitory computer readable storage medium of claim 2 further comprising executable instructions to specify a delta load task to read all source tables, apply data transformations and perform a table comparison operation before loading data into a target table.

4. The non-transitory computer readable storage medium of claim 1 wherein the evaluation identifies a source data change indicators in the form of time stamps.

5. The non-transitory computer readable storage medium of claim 4 further comprising executable instructions to specify a delta load task to read sub-sets of source table entries, apply data transformations and perform a table comparison operation before loading data into a target table.

6. The non-transitory computer readable storage medium of claim 5 further comprising executable instructions to create joins between change records and source table entries.

7. The non-transitory computer readable storage medium of claim 6 further comprising executable instructions to make split data sets distinct.

8. The non-transitory computer readable storage medium of claim 6 further comprising executable instructions to create joins with time delimited where clauses.

9. The non-transitory computer readable storage medium of claim 1 further comprising executable instructions to specify a delta load task to join selected rows of changed data.

10. The non-transitory computer readable storage medium of claim 1 further comprising executable instructions to roll up multiple data changes.

11. The non-transitory computer readable storage medium of claim 1 further comprising executable instructions to assess primary key and join clause information to identify table dependency.

12. The non-transitory computer readable storage medium of claim 1 wherein the evaluation identifies transaction log resources specifying complete source replication data.

13. The non-transitory computer readable storage medium of claim 12 further comprising executable instructions to specify a delta load task based solely upon transaction log resources.

14. The non-transitory computer readable storage medium of claim 1 further comprising executable instructions to process change records and source records to establish a mapping to a target.

15. The non-transitory computer readable storage medium of claim 1 further comprising executable instructions to identify all changes required in the target.

16. The non-transitory computer readable storage medium of claim 1 further comprising executable instructions to process cached segments of insert and update data.

17. A non-transitory computer readable storage medium, comprising executable instructions to:
   support the definition of an Extract Transform and Load (ETL) task;
   access a transaction log including source data change indicators, the source data change indicators characterizing changes made to at least one source table structure;
   establishing a mapping from the at least one source table structure to at least one target table structure based on the source data change indicators; and automatically generating, based on the source data change indicators identified in the transaction log, a delta load task based on the ETL task and the mapping, the generated delta load task updating the at least one target table structure of the respective target in accordance with the changes made to the at least one source table structure, wherein the delta task is different from the ETL task and is selected, based on available system resources, from a plurality of delta load tasks that include at least one of the following: a target-based delta task, a timestamp-based delta task, a capture-data-change-based with primary key information only delta task, and a capture-data-change-based with full table structure information delta task.

18. A method comprising:

extracting data from source tables of one or more sources;

transforming the extracted data to a format compatible with a respective target of a plurality of targets;

loading the transformed data into a target table of the respective target;

determining changes in the source tables; and automatically updating, using a delta task generated based on source data change indicators identified in a transaction log corresponding to the determined changes in the source tables, the target table of the respective target in accordance with the determined changes in the source tables, wherein the delta task is selected, based on available system resources, from a plurality of delta load tasks that include at least one of the following: a target-based delta task, a timestamp-based delta task, a capture-data-change-based with primary key information only delta task, and a capture-data-change-based with full table structure information delta task.

* * * * *